Sept. 11, 1934. H. AUSTIN 1,973,553
CHANGE SPEED GEAR FOR USE MORE ESPECIALLY WITH MOTOR ROAD VEHICLES
Filed Nov. 13, 1930 4 Sheets-Sheet 1

Inventor:
Herbert Austin
By
Pennie Davis Marvin & Edmonds
attorneys

Patented Sept. 11, 1934

1,973,553

UNITED STATES PATENT OFFICE 1,973,553

CHANGE SPEED GEAR FOR USE MORE ESPECIALLY WITH MOTOR ROAD VEHICLES

Herbert Austin, Bromsgrove, England

Application November 13, 1930, Serial No. 495,314
In Great Britain November 21, 1929

1 Claim. (Cl. 74—57)

This invention relates to change speed gear of the general type in which one of the speeds, usually that which is next below the direct drive, is obtained by means of an excentrically mounted sleeve with internal teeth at one end and external teeth at the other connecting with the driving and driven shafts; the main purpose being to provide a gear which is relatively silent.

In a gear of the above type it has already been proposed to provide a central and longitudinally moving shaft or arbor having clutch teeth at its two ends one set to couple the driven shaft to the driving shaft for direct drive and the other set to connect with splines or clutch teeth of a wheel which has external teeth constantly in mesh with the internal teeth of the said excentrically mounted sleeve, the said wheel running loose upon the arbor when the clutch teeth of the arbor are not in engagement therewith; and the present invention has for its object to modify the construction of such a gear with a view to simplification and reduction of the number of parts in the gear box.

According to the main feature of the invention the teeth at one end of the excentrically mounted sleeve are constantly in mesh with corresponding teeth of the driving shaft while the teeth at the other end of the said sleeve are engaged with and disengaged from an endwise movable wheel which is mounted on the arbor and turns therewith, the arbor being splined to the driven shaft, and having clutch teeth by which it can be engaged with and disengaged from the driving shaft.

Convenient embodiments of the invention are described with reference to the drawings herewith of which:—

Figure 1:
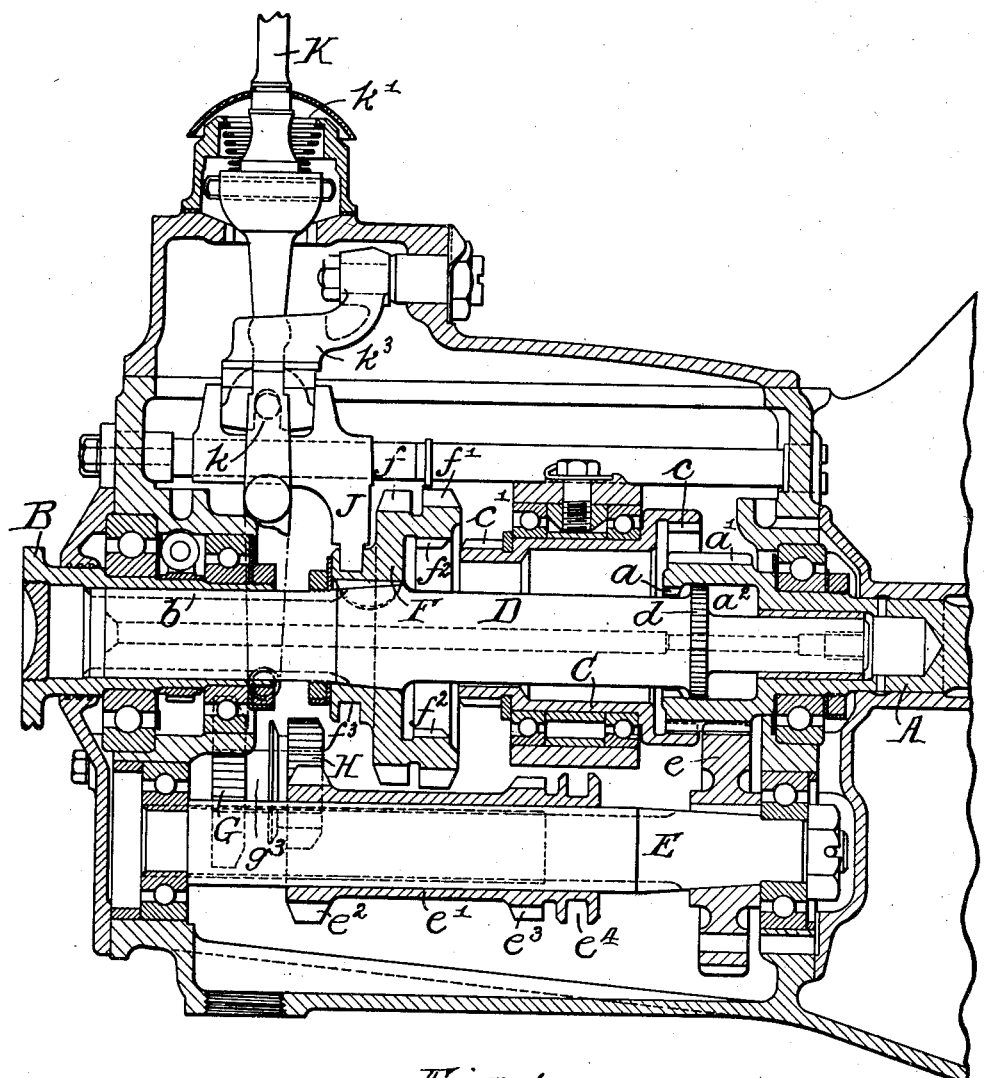
Figure 1 is a longitudinal vertical section of a gear box constructed according to one form of the invention.
Figure 2:
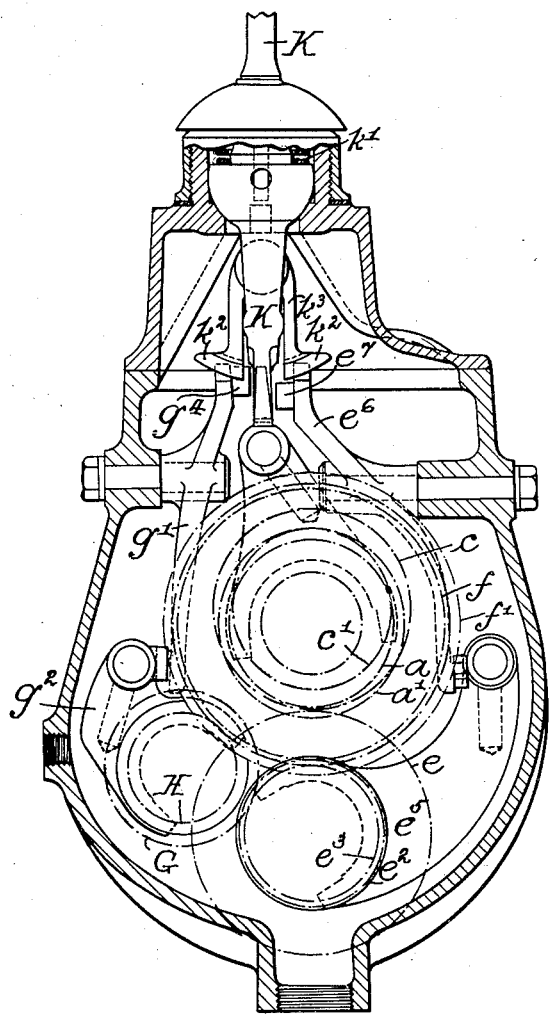
Figure 2 is a transverse sectional view but showing the wheels as pitch lines only.

Referring first to Figures 1 and 2, A is the driving shaft, B the driven shaft and C the excentrically mounted sleeve, the latter having internal teeth $c$ and external teeth $c'$. D is the arbor having clutch teeth $d$ at one end for engagement with internal clutch teeth $a$ of the driving shaft A and being splined at $b$ to the driven shaft B. The driving shaft A has also external teeth $a'$ which are constantly in mesh both with the teeth $c$ above referred to and with the teeth of a wheel $e$ rigidly mounted on a lay shaft E, on which is splined a sleeve $e'$ having two sets of gear teeth $e^2$ and $e^3$, and also a groove $e^4$ for a selector fork $e^5$ (see Figure 2). F is the arbor wheel keyed to the arbor D and having two sets of external teeth $f$ $f'$ adapted to be slid into engagement with the teeth $e^2$ $e^3$ respectively of the lay shaft sleeve $e'$ and having also internal teeth $f^2$ adapted to be slid into engagement with the external teeth $c'$ of the excentric sleeve C. G and H are two wheels on a common sleeve used for reversing and being adapted to be slid endwise to bring the teeth of the wheel G into engagement with the teeth $e^2$ and the teeth of the wheel H into engagement with teeth $f$. The arbor wheel F has a groove $f^3$ with which engages a selector fork J which is moved by a hand lever K when the latter is in its midlongitudinal position as shown in Figure 2. When the lever K is moved to the left (as shown in Figure 2) its foot engages with a selector fork lever $e^6$ which then operates the selector fork $e^5$; and, when the lever K is moved to the right its foot engages a selector fork lever $g'$ which operates a selector fork $g^2$ which engages with a groove $g^3$ of the reversing sleeve (see Figure 1).

For fourth or top speed the arbor D is moved to the left (rearward) to bring the clutch teeth $d$ of the arbor into engagement with the clutch teeth $a$ of the driving shaft A and thus obtain direct drive as the arbor is splined on the driven shaft B.

For third speed the arbor is moved to the right causing the clutch teeth $d$ to pass into a cup $a^2$ formed in the end of the shaft A. At the same time the internal teeth $f^2$ of the arbor wheel are slid into engagement with the external teeth $c'$ of the excentric sleeve C. The drive is then from the driving shaft to the sleeve C by the teeth $a'$ and $c$, from the sleeve C to the arbor wheel F by the teeth $c'$ and $f^2$, from the arbor wheel to the arbor and from thence through the splines $b$ to the driven shaft. Thus the drive is through the excentric sleeve and therefore by way of internal teeth engaging with external teeth so that a relatively silent gear is obtained.

For second speed the arbor is brought back to neutral which is the position shown in Figure 1 and the lay shaft sleeve $e'$ is moved to the right to engage the teeth $e^2$ with the teeth $f$ of the arbor wheel F.

For the first speed the arbor is still kept in neutral and the lay shaft sleeve moved to the left to bring the teeth $e^3$ into engagement with the teeth $f'$.

The change gear lever K is forked at its foot to leave an aperture $k$ (see Figure 1) adapted when the lever is rocked to the left (as seen in Figure 2) to engage over a peg $e^7$ of the selector lever $e^6$ which moves the sleeve $e'$ for first and second speeds, and adapted, when the lever K is rocked to the right and lifted up against a spring $k'$ (see Figure 1), to engage over a peg $g^4$ (see Figure 2) of the selector lever $g'$ which moves the reversing wheels. Unless the lever K is lifted up the recess $k$ cannot engage with the peg $g^4$, so that a reverse stop is provided. The levers $g'$ and $e^6$ are provided with notches into one or the other of which passes one of two wings $k^2$ of a locking arm $k^3$ which is moved laterally but not longitudinally by the lever K.

Figure 3:
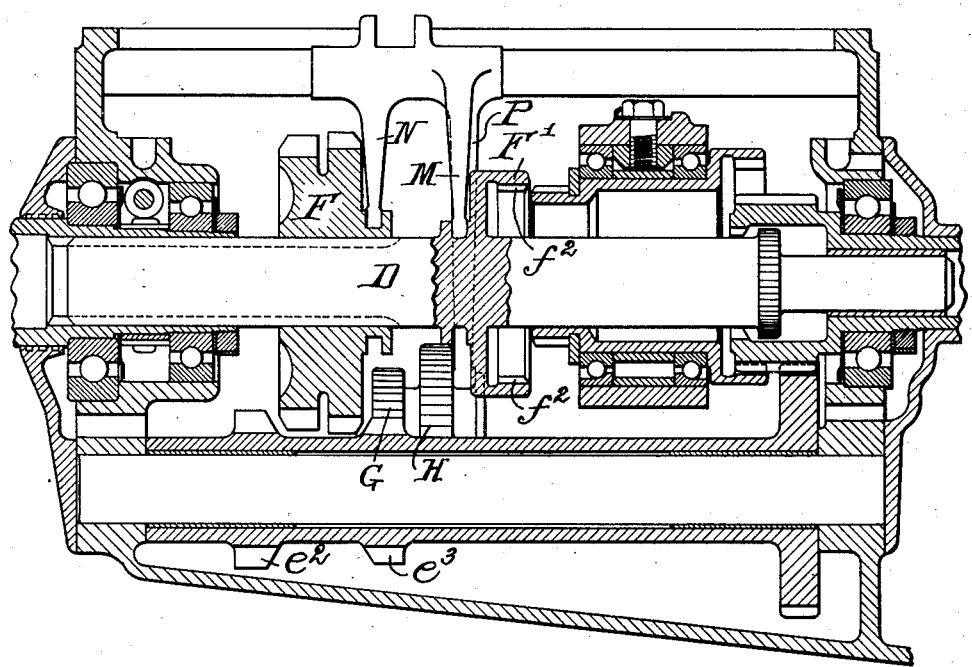
Figures 3 and 4 are longitudinal sectional views of two modifications of the invention.

In the modification shown in Figure 3, the arbor wheel is not rigid with the arbor but is splined thereto but there is formed in one piece with the arbor a separate wheel F' carrying the internal teeth $f^2$. In this case the wheels $e^2$ $e^3$ are not movable endwise, the wheel F being movable instead. In this case the third and fourth gears are obtained simply by right and left hand movement of the arbor D by a selector fork M and the first and second speeds by right and left hand movement of the wheel F by the selector fork N. The reverse is obtained in a manner similar to the first modification by endwise movement of the reverse wheels G and H by the selector fork P. These three selector forks are operated in the same manner as that shown in Figures 1 and 2 or in any other known method.

Figure 4:
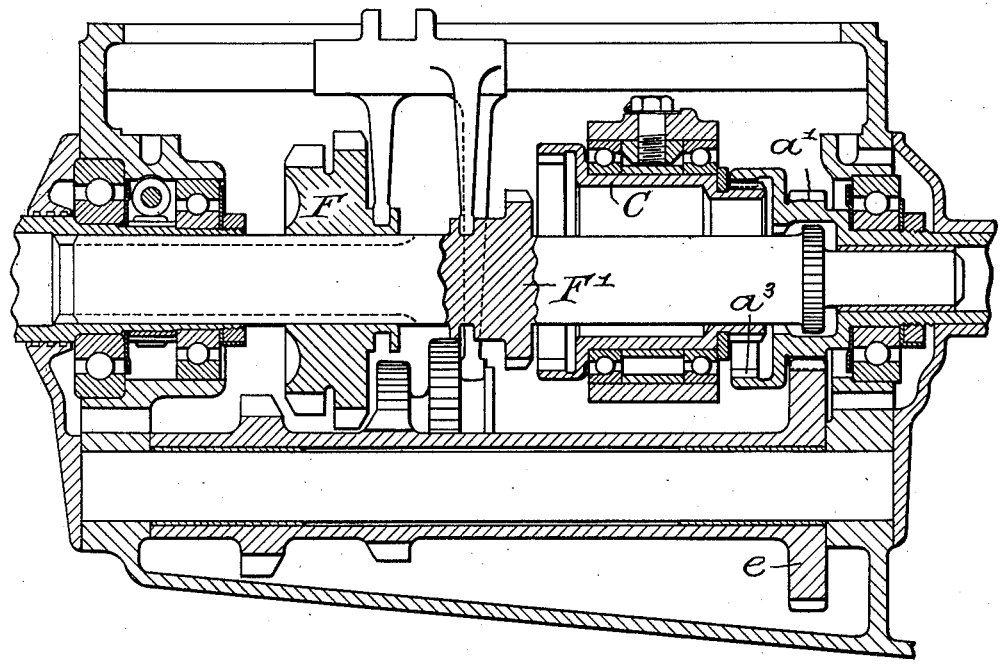

Referring to Figure 4 the arrangement is very similar to Figure 3 but the drive through the sleeve C constitutes a supergear, that is a speed above direct drive, the wheel F' in this case having external teeth and the driving shaft having internal teeth $a^3$. Its external teeth $a'$ drive only the lay shaft wheel $e$.

It will be seen that the various modifications above described provide constructions in which, when the gear is in neutral and the vehicle coasting, the road wheels thereof impart no turning movement to the concentric sleeve and that under such conditions the latter rotates only if the engine is turning.

Having fully described my invention what I claim and desire to secure by Letters Patent is:—

A change speed gear comprising a driving shaft, a co-axial driven shaft, the inner ends of said shafts having a space therebetween, a central arbor co-axial with said driving and driven shafts and occupying the space between said shafts, said arbor being permanently splined to the driven shaft, an eccentrically mounted sleeve surrounding the arbor, said driving shaft and eccentrically mounted sleeve having gear teeth through which said sleeve is driven from said shaft, the teeth of one of said members being internal and the teeth of the other being external, clutch teeth on said driving shaft, clutch teeth on said arbor adapted to engage the clutch teeth upon the driving shaft when said arbor is moved in one direction, a gear wheel fixedly secured on said arbor, a set of gear teeth on said wheel adapted to engage gear teeth on the driving end of said eccentrically mounted sleeve when said arbor is moved in the other direction, a lay shaft permanently driven by said driving shaft, a driving wheel on said lay shaft, teeth on the driving wheel of the lay shaft, and a second set of gear teeth on the gear wheel fixedly secured on said arbor, the driving wheel of the lay shaft being movable axially to cause its teeth to be brought into engagement with said other teeth of the gear wheel, whereby drive may be transmitted from said lay shaft to said arbor.

HERBERT AUSTIN.